July 8, 1924.  
W. F. CARLBERG  
EXCAVATING SHOVEL OR SCRAPER  
Filed May 10, 1922  
1,500,104  
2 Sheets-Sheet 1
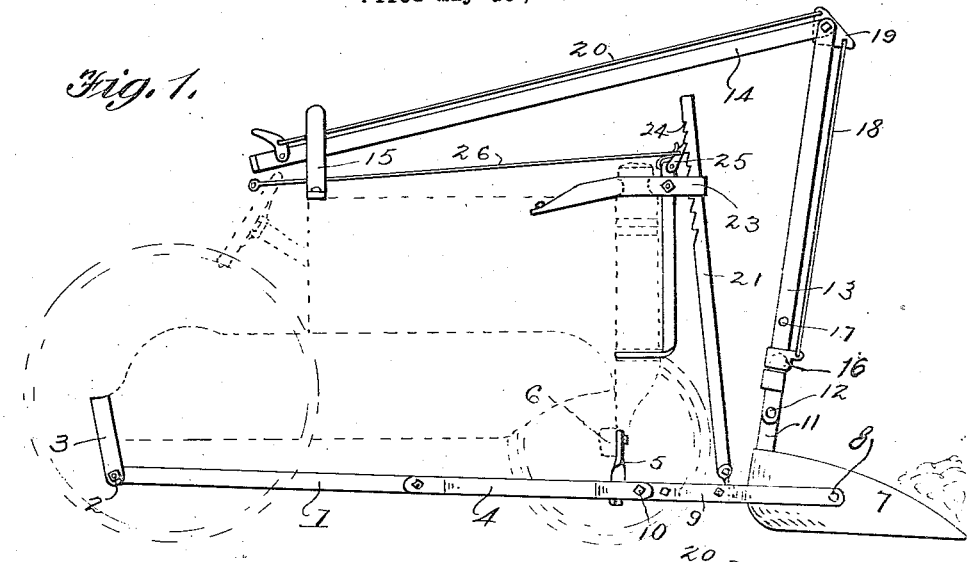
Fig. 1.
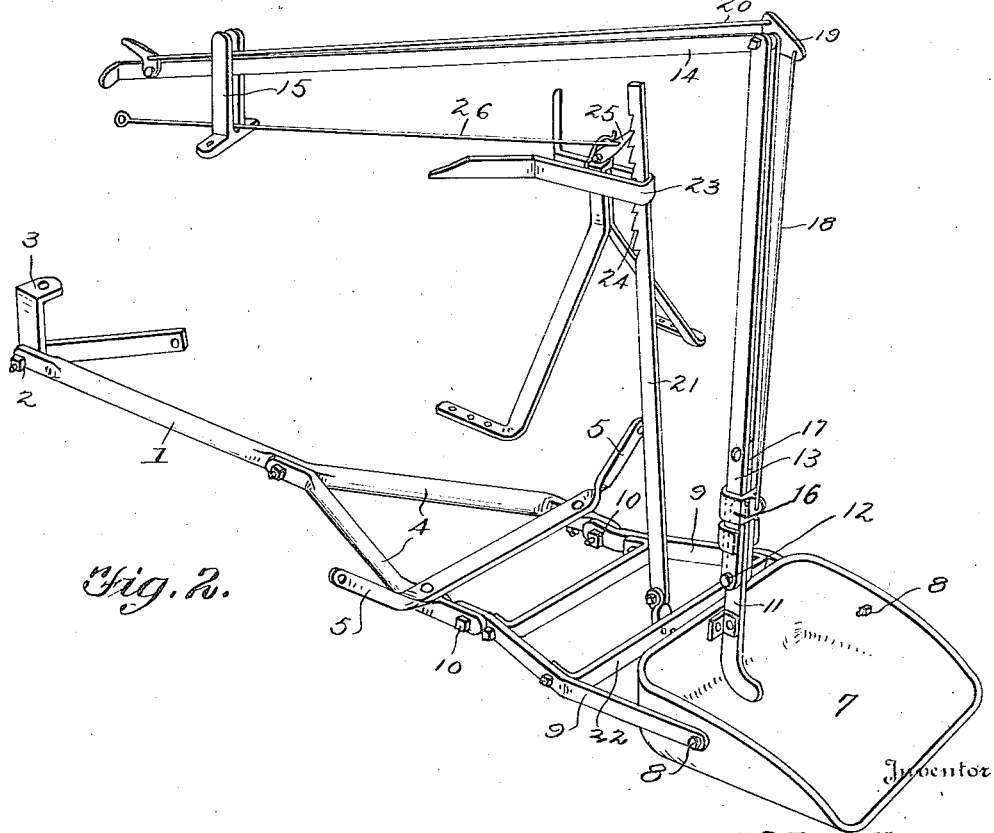
Fig. 2.
W. F. Carlberg.
Attorney July 8, 1924.  
W. F. CARLBERG  
EXCAVATING SHOVEL OR SCRAPER  
Filed May 10, 1922  
1,500,104  
2 Sheets-Sheet 2

W. F. Carlberg.

Patented July 8, 1924.

UNITED STATES PATENT OFFICE.

1,500,104

WALFRED F. CARLBERG, OF SISSETON, SOUTH DAKOTA.

EXCAVATING SHOVEL OR SCRAPER.

Application filed May 10, 1922. Serial No. 559,841.

*To all whom it may concern:*

Be it known that I, WALFRED F. CARLBERG, a citizen of the United States, and residing at Sisseton, in the county of Roberts, in the State of South Dakota, have invented certain new and useful improvements in excavating shovels or scrapers designed to be attached to the forward end of a tractor and capable of complete operative handling from the driver's seat.

The improved shovel is mounted for tilting control from the driver's seat, and is so independently supported in its mountings that it will automatically rise or elevate itself under load strain and automatically lock in such elevated position, whereby the shovel and load picked up by the same is raised to a position clear of the ground, so that it may be readily moved from place to place without interference.

The shovel proper is further mounted for an independent swinging movement for dumping purposes, the control of this movement being from the driver's seat and permitting automatic dumping of the shovel load at the will of the operator.

The improved excavator is designed more particularly for use with Fordson tractors, and to counteract the tendency of these tractors to rise in front, the excavator in addition to being supported in front of the tractor, is so connected to the rear draw bar cap that the load strain of the digging operation will hold down the front end of the tractor, and thereby prevent the tractor from rising in front.

The invention is illustrated in the accompanying drawings, in which:

Fig. 1 is a view in side elevation, showing the improved excavator in applied position on the tractor, the tractor being shown in dotted outlines.

Fig. 2 is a perspective view of the shovel support.

Figure 3:
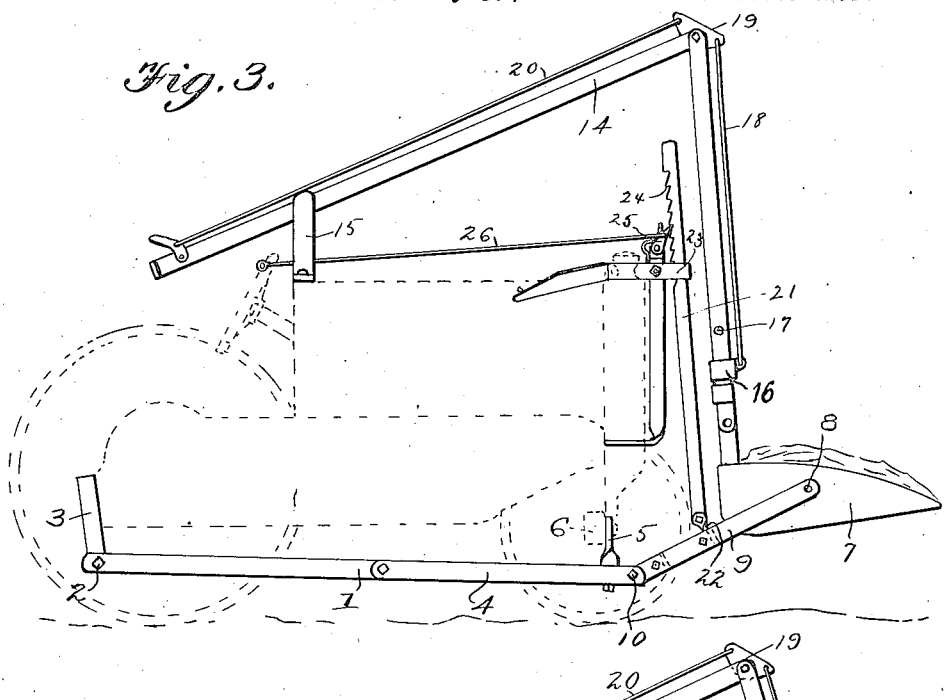
Fig. 3 is a similar view with the shovel shown elevated.
Figure 4:
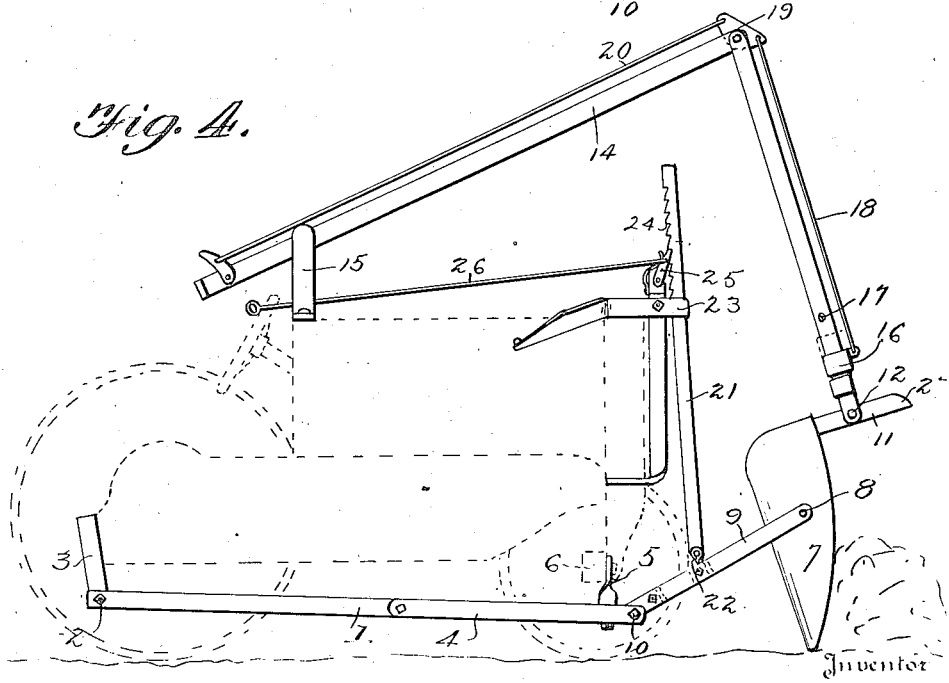
Fig. 4 is a side elevation, showing the shovel in dumping position.

The scraper frame includes a push rod 1, rigidly secured at 2 in a hanger 3 depending from draw bar cap of the tractor at the rear or driving end. The forward end of the push rod is branched to provide spaced arms 4, rigidly secured to straps 5, fixed at their upper ends to the forward axle 6 of the tractor.

A shovel or scraper bucket 7 of appropriate form is pivotally supported at 8 at the forward end of links 9, the rear ends of which links are pivotally connected at 10 to the forward ends of the arms 4. The bucket 7 is mounted in the links in rear of the center of gravity of the said bucket, so that when operator pulls back on an operating lever, the scraper tips up at the front end so that endwise pressure on the bucket tends to raise or elevate same.

The rear wall of the bucket is centrally provided with an upright 11, which is pivotally mounted at 12 to the lower end of a tilting bar 13, this bar being preferably in the form of two bar-like plates arranged one on each side of the upright 11. The upper end of the tilting bar is pivotally connected to an operating rod 14, which extends into proximity to the driver's seat, and adjacent such seat is preferably guided between uprights 15. A coupling sleeve 16 slidably embraces the bar-like plates of the tilting bar 13 near their lower ends, said sleeve when in position to overlie the upper end of the upright 11, serving to secure said upright and tilting bar as a rigid member. A stop 17 on the tilting bar serves to limit the lower position of the sleeve. The sleeve is elevated to release the upright 11 and thereby permit free tilting of the bucket 7 on the pivotal support 8, through a connector 18 secured at the lower end to the sleeve and to the upper end to a triangular plate 19, supported on the pivotal connection between the tilting bar and operating rod, this plate being in turn provided with an operating wire or connector 20, leading to the driver's seat. Thus, the driver at will can elevate the sleeve 16 and free the bucket for an independent dumping operation.

It has been previously explained that under endwise pressure on the bucket, the bucket tends to automatically elevate itself to a position clear of the surface on which it is working when the front of the scoop has been elevated through manipulation of rod 14 by the operator. This elevation of the bucket with the load is to permit convenient transportation of the load from place to place without interference, and means must be provided whereby the bucket may be held in this elevated position at will. This means includes a locking bar 21, pivotally secured at its lower end to a brace 22, extending between the links 9. The upper end of the locking bar projects through a guide 23, and is formed on the inner edge with notches or teeth 24 adapted to be engaged by a pawl 25, conveniently arranged and supported above the radiator of the tractor, and normally held operative by a spring 28. An operating cord 26 controls the spring pressed pawl, to release the locking rod at will, it being understood that the pawl operates automatically through spring 28 to lock said rod, and thereby hold the bucket in elevated position.

In operation, the tractor with the scraper bucket in lowered position is forced into the material to be excavated. The bucket may be tilted as desired by the obvious operation of the rod 14, and as it picks up its load, is gradually elevated through movement of the links 9 and locked in such elevated position by the locking rod 21. This tilting of the bucket changes the normal or operative plane of such bucket with relation to the plane of the links 9, and under digging pressure on the forward edge of the bucket, the links 9 swing about their pivotal supports 10, to elevate the bucket, as will be plain from Fig. 3. The loaded shovel may be transported to the desired place of dumping, and the sleeve 16 raised to free the upright 11, permitting the bucket to automatically dump the load. When the load is discharged, the shovel returns to normal position by backing up the tractor about two feet, the rounded upper end 27 of the upright 11 displacing the sleeve 16 to permit an automatic coupling in an obvious manner. The improved attachment requires the attention of a single operator, and entirely overcomes the tendency of the particular tractor used to tip over backward. By providing the scraper bucket in front of the tractor, a grade filling across a body of water or in an excavation can be readily made, as the operations of the bucket are entirely in advance of the tractor, and the latter remains on solid ground, while the body of water or excavation is receiving the load from the bucket. By the various means of control provided, the entire operation can be handled by one man, that is, the driver of the tractor, who may properly control all operations from, and without the necessity of, leaving the driver's seat. The construction is particularly arranged to adapt the same for convenient connection to and cooperation with the Fordson tractor as now constructed.

Claims:

1. An excavating scraper, designed for connection with tractors, including a scraping bucket, means to permit said bucket to automatically elevate on endwise strain incident to a scooping movement, and means to automatically lock said bucket in elevated position.

2. An excavating scraper, designed for connection with tractors, including a scraping bucket, links pivotally supporting said bucket, and permitting said bucket to bodily elevate on digging strain, and a locking rod connected with said links and adapted to automatically lock the bucket in elevated position.

3. An excavating scraper, designed for connection with tractors, including a scraping bucket, links pivotally supporting said bucket and permitting said bucket to bodily elevate on endwise strain, manually operable means for tilting said bucket with respect to said links, and a locking rod connected with said links and adapted to automatically lock the bucket in elevated position.

4. An excavating scraper, designed for connection with tractors, including a scraping bucket, links pivotally supporting said bucket and permitting said bucket to bodily elevate on endwise strain, manually operable means for tilting said bucket with respect to said links, manually operable means to release said bucket for automatic dumping, and a locking rod connected with said links and adapted to automatically lock the bucket in elevated position.

5. An excavating scraper, including a supporting frame, links pivotally connected thereto, a bucket pivotally supported in the links, an upright rising from the bucket, a tilting bar pivotally connected to the upright, a coupling sleeve for holding the upright and tilting bar in aligned positions, a locking rod pivotally connected to the links and formed with teeth, and a spring pressed pawl to cooperate with said teeth.

6. An excavating scraper designed for connection in advance of and to be operated in the foreward movement of a tractor, including a scraping bucket, a link support therefor, and means for changing the operature digging plane of the bucket to the ative digging plane of the bucket to the plane of the link support to cause endwise pressure on the bucket to force the bucket to an elevated position by means of said link support.

7. An excavating scraper designed for connection in advance of and to be operated in the forward movement of a tractor, including a scraping bucket, a link support therefor, and means for changing the operative digging plane of the bucket to the plane of the link support to cause endwise pressure on the bucket to force the bucket to an elevated position by means of said link support, and means operative in the elevating movement of the bucket to lock said bucket in the final elevated position.

8. An excavating scraper designed for connection with a tractor and including a scraping bucket, a link support in which the bucket is rotatively mounted, means for normally holding the digging plane of the bucket in line with the pivots of the link supports to permit said bucket to be forced into the material, said means being operable to change the loading plane of the bucket with respect to the pivots of the link supports to cause loading strain on said bucket to bodily elevate the bucket by means of said link supports.

9. An excavating scraper designed for connection with a tractor and including a scraping bucket, a link support in which the bucket is rotatively mounted, means for normally holding the digging plane of the bucket in line with the pivots of the link supports to permit said bucket to be forced into the material, said means being operable to change the loading plane of the bucket with respect to the pivots of the link supports to cause loading strain on said bucket to bodily elevate the bucket by means of said link supports, a rod connected with the link supports and movable in the elevation of the bucket, and means to engage said rod to lock the bucket and link supports in elevated position.

In witness whereof, I hereunto subscribe my name to this specification in the presence of two witnesses.

W. F. CARLBERG.

Witnesses:
   H. M. KNIGHT,
   LAURA RASK.